Figure 3:
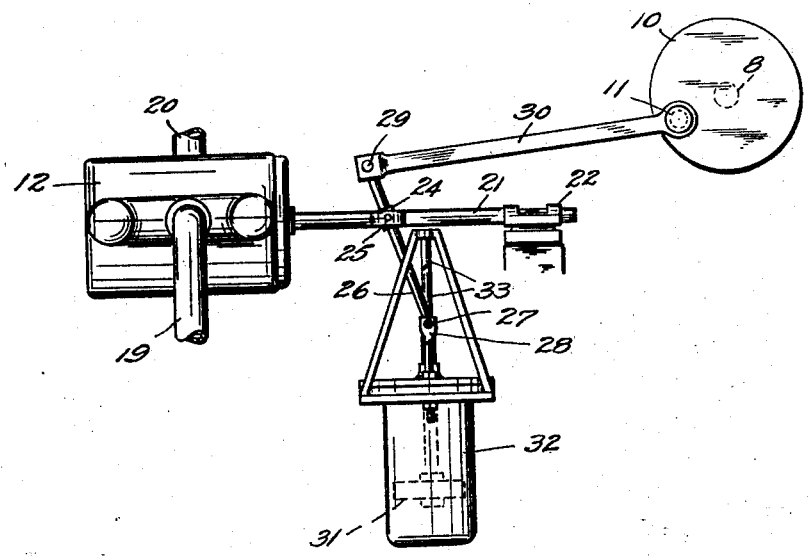

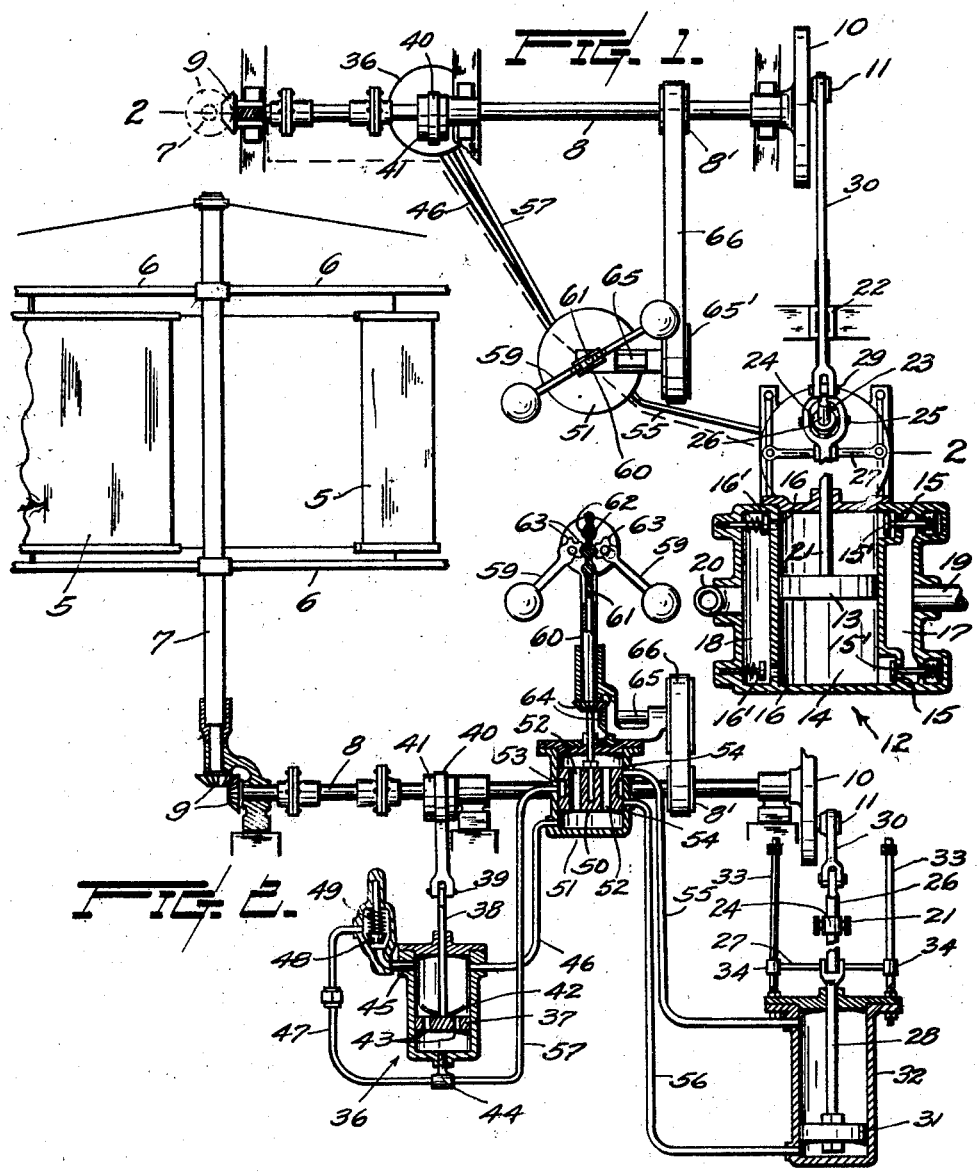

June 26, 1928.　　　　　　　　　　　　　　　1,675,159
F. R. BURCH
AUTOMATIC SPEED CONTROL FOR WINDMILLS
Filed June 16, 1926　　　　2 Sheets-Sheet 2

INVENTOR:
Frederick R. Burch
BY
Pierre Barnes
ATTORNEY.

Patented June 26, 1928.

1,675,159

UNITED STATES PATENT OFFICE.

FREDERICK R. BURCH, OF SEATTLE, WASHINGTON.

AUTOMATIC SPEED CONTROL FOR WINDMILLS.

Application filed June 16, 1926. Serial No. 116,494.

This invention relates to speed governors for wind operated motors.

The objects of the invention, generally stated, are first, to provide apparatus which will regulate the performance of a wind motor responsive to variations in the speed or power of the wind which operates the motor so that the power agent will be utilized to its maximum extent that at all velocities thereof and without either under or over burdening the motor; and, second to provide apparatus which will be effectually controlled by the work in a manner to cause the wind motor to operate at a substantially uniform predetermined speed regardless of any variation of the power or velocity of the wind which impels the moving parts of the motor to have the same operate at its most efficient speed under all conditions of wind.

More specific objects and advantages of the invention will appear in the following description.

The invention is based upon the well understood principle of mechanics to the effect that the amount of work is proportional to and is measured by the product of the resisting force multiplied by the amount of motion along the direction of the force.

The invention is attained by three co-operating agencies, namely—the work regulator, the regulator setting system, and governing devices.

The invention further consists in the novel construction, adaptation and combination of parts hereinafter described and claimed.

In the accompanying drawings,—

Figure 1 is a view partly in plan and partly in horizontal section of devices embodying my invention; Fig. 2 is a view of the same, partly in elevation and partly in vertical section, said section being taken substantially on the broken line 2—2 of Fig. 1, and including in elevation a diagrammatic representation of a wind motor; and Fig. 3 is an end elevation taken from the right hand side of Fig. 1.

For the purpose of exemplifying my invention, it is shown applied to the type of wind motor which is illustrated and described in patent application, Serial No. 96,451, filed by me March 22, 1926. Said wind motor, as represented in Fig. 2 of the drawing in the present case, comprises a plurality of sails 5 carried by the horizontal arms 6 of a rotary mast 7.

The mast is operatively connected to a driven, or power, shaft 8 by means of toothed gearing 9 to cause the shaft to be rotated at a speed having a definite ratio to the rotary speed of the mast 7.

The power shaft 8 is provided with a crank, herein shown as a disk wheel 10 provided with a crank pin 11, whereby a pump 12 is actuated for pumping water. This pump 12 may be of any suitable type and size. For illustrative purposes, said pump is shown as of the double acting type having a piston 13 arranged to be reciprocated in the pump bore 14, with an inlet port 15 and an outlet port 16 at each end of the bore through which communication is had with the pump's intake and discharge chambers 17 and 18, respectively.

Said ports are controlled by spring closing valves $15^1$ and $16^1$ acting responsive to the strokes of the piston 13. 19 represents a suction pipe leading from a sump or other source of water supply to the intake chamber; and 20 is a pipe for the delivery of water from the pump discharge chamber 18.

According to the illustrated embodiment of the present invention, the rod 21 for said piston operates in a guide 22 (Fig. 3); and between the said guide and the pump cylinder the rod is formed or provided with an opening 23 to receive a hollow block 24 which is connected for oscillatory movement to the rod by means of trunnion studs 25.

The block 24 is mounted upon an arm 26 which is arranged for vibratory movement in a vertical plane by having its lower end pivotally connected by a pin 27 to a support 28.

The upper end of the arm 26 is connected by a pin 29 to an end of a connecting rod 30 whose other end is connected to the crank pin 11 of the shaft 8 for transmitting power from the shaft to operate the pump.

As best shown in Fig. 2, the arm support 28 is afforded by the piston rod of a piston 31 which is movable vertically in the bore of a liquid containing cylinder 32. The movement of the support above the cylinder is regulated by suitable guides, herein shown as posts 33 extending through ways provided in sleeves 34 provided upon the extremities of the pin 27. As will be understood from an inspection of Fig. 3, by elevating the support 28 for the arm 26 the connection (at 29) of the arm with the connecting rod 30 is elevated above the plane of movement of the pump piston rod 21 bringing the latter, in effect, closer to the axis of movement of the vibratory arm 26; but when said support is lowered, the connection of the latter with the connecting rod 30 is brought closer to the plane of movement of the pump rod 21 whence the pump rod is, in effect, moved away from the axis of vibration of said arm. From the foregoing it is apparent that the extent of the vibratory movement of the arm 26 imparted thereto by the connecting rod from the crank of the shaft 8 is constant whereas the length of the stroke of the pump piston is dependent upon the distance the plane of travel of the pump rod 21 is above the axis of the pin connection of arm 26 with the vertically movable support 28—or, as may otherwise be stated, changing of the lengths of the arc of travel of the block 24, which is sleeved upon the vibratory arm, changes the lengths of stroke of the pump piston 13.

The mechanism above described including the piston 31, the link, or vibratory arm, 26 together with the connections between the latter and both the connecting rod 30 and the rod 21 of the pump piston 13 for regulating the extent of motion of such piston constitutes a sub-organization of the invention which I designate as the "work regulator" and its operation may be explained as follows: When the pump is operating with short strokes there is relatively little water discharged from the pump, a most efficient performance when the wind motor is actuated by a light breeze—that is to say, have the motor produce little work when the power is light.

When the pump piston, however, is operating with long strokes the volume of water discharged from the pump is relatively large, a desirable condition to prevail when the wind motor is subjected to the power afforded by a wind of high velocity, thus furnishing work suitable for a heavy wind.

For controlling the work regulator, there is employed what I term as the "regulator setting system" a sub-organization of the invention which is actuated by the motor, preferably through the medium of the pump operating shaft 8, and is controlled by the speed thereof by another sub-organization which I have termed the "governing devices" to be hereinafter described.

Said regulator setting system, consists of apparatus utilizing therein a fluid, such as oil for example, as the power transmitting agent. Such apparatus or system, see Fig. 2, includes a circulating pump having a cylinder 36 containing an apertured piston 37, the piston rod 38 thereof being connected at 39 to the rod element of a ring 40 which is mounted upon an eccentric 41 which is rigidly secured upon the shaft 8.

The pump piston 37, as illustrated, is provided with a valve 42 arranged to open and close in relation to the piston apertures 43 in the down and upstrokes, respectively, of the piston.

The cylinder 36 is provided at its lower end with an inlet connection 44 and at its upper end with openings for outlet connections 45 and 46. The inlet and outlet connections 44 and 45, respectively, constitute part of a by-pass including a pipe 47 and a relief valve of which the valve 48, proper, is actuated by a spring 49 to close the by-pass against the flow of fluid therethrough when the piston 37 is operating except when the outlet 46 of the cylinder is rendered inoperative by means of a valve 50 which forms a member of the governing devices above mentioned.

This valve 50, as shown, is in the nature of a piston valve operating in a casing 51 to control the flow of fluid between the pump cylinder 36 and the cylinder 32.

The valve 50 is characterized by the provision of passages 52 affording communication between the spaces at both ends of the casing 51. The valve is also provided with a cavity 53 extending circumferentially thereabout between annular ridge portions 54 of the valve, each of the ridges being of a diameter to fit the bore of the casing.

These ridges 54 are, moreover, spaced apart so that, in the intermediate position of the valve, as represented in Fig. 2, they will cover ports provided in the peripheral wall of the casing. The last mentioned ports communicate by means of pipes 55 and 56 with the upper and lower ends respectively of the bore of the cylinder 32 containing the piston member 31 of the work regulator.

The valve casing 51 is also provided at one end of its bore with an opening which is shown as connected by means of the pipe 46 with the upper end of the pump cylinder 36. The valve casing 51 is also connected by a pipe 57 leading to the inlet connection 44 of the cylinder 36 from a port located in said casing so as to always communicate with the valve cavity 53.

The above described regulator setting system operates as follows: When the valve 50 (which controls the system) is moved upwardly to uncover the ports for pipes 55 and 56, communication is established between the discharge end of the pump cylinder 36 and the lower end of the cylinder 32, with a return lead from the upper end of the cylinder 32 by way of the valve cavity 53 to the intake end of the pump cylinder.

When this condition prevails, oil is forced by the circulating pump into the cylinder 32 below the piston 31 causing the latter to move upwardly thus influencing the work regulator by elevating the support 28 for the vibratory arm 26 to reduce the effective length of strokes of the connecting rod 30 with respect to the stroke of the work piston 13 of the pump 12. When by a downward movement of the valve 50 there is an uncovering of the ports for the pipes 55 and 56, communication is established between the upper and lower ends, respectively, of both of the cylinders 32 and 36, resulting in the circulating pump forcing oil under pressure into the upper end of cylinder 32 and an outflow of liquid from below the piston 31 whereby the latter is caused to descend accompanied by the vibratory arm 26 to increase the length of strokes of the piston 13.

When the valve 50 is returned to the position in which it is illustrated in Fig. 2, it prevents any communication for the flow of liquid from one to the other of the referred to cylinders, 32, 36; whereupon the bodies of oil remaining in the cylinder 32—above and below the piston 31—serve mutually to retain the same for the time being in static condition.

The piston 31 when thus held is in its normal position, as will obtain when the wind motor is actuated by a substantially steady wind, fluctuations in the wind velocity being compensated for by shortening or increasing the length of the strokes of the pump piston 13 to correspondingly decrease or increase the amount of work required by the motor.

It is to be noted that when the pipe connections between the two cylinders of the regulator setting system are rendered inoperative by the valve 50, the by-pass connections, 45—47, between the ends of the cylinder 36 become operative for the short circuiting of the liquid from end to end of the circulating pump.

All of the operations of the regulator setting system are controlled through the instrumentality of the valve 50 which forms a part of the third sub-organization of devices which, as a whole, is designated as the governing devices.

The governing devices function responsive to the speed of the wind motor. Included in such devices is a suitable speed governor, that shown being a centrifugal ball governor in which the ball carrying arms 59 are pivoted to the upper end of a rotary hollow spindle 60 through which extends the stem 61 of the valve 50.

Said stem is provided with rack teeth 62 in continuous mesh with the gear teeth 63 provided upon the arms 59 whereby the valve is caused to ascend and descend by the descending and ascending movements, respectively, of the governor balls when they are influenced by gravitation and centrifugal force obtaining at different revoluble speeds.

For revolving these balls, the spindle 60 is rotated by toothed gearing 64 from a shaft 65 which is driven from the power shaft 8 as by means of an endless belt 66 passing about pulleys $8^1$ and $65^1$ mounted upon the respective shafts.

From the foregoing description it will be seen that the governing devices acting through the agency of a controlling valve regulates the action of the control, or setting system, for the regulator which governs the stroke of pump by which the work is performed so that there will at all times be a balance of power and duty such that the motor will be constrained to operate at an approximately uniform speed under various wind pressures.

I have thus provided an automatic speed-control suitable for use on windmills.

While the embodiment of the invention which I have described has proved most efficient in practice, yet I do not wish to be understood as limiting the invention thereto, as other embodiments may be made within the scope of the appended claims.

What I claim, is,—

1. The combination with a windmill and a power pump, of operative connections between the said windmill and said pump for operating the latter, said connections including adjustable means for varying the effective power of said pump, fluid actuated apparatus for regulating said adjustable means, a valve controlling the action of the fluid agent within said apparatus, a speed governor operated by the windmill and operatively connected with the valve whereby the fluid agent of said apparatus is utilized to increase and decrease the effective power of said pump corresponding to the increase and decrease, respectively, of the force of the wind which operates the windmill.

2. The combination with a windmill, a power pump having a piston therein, a piston rod therefor, and a crank shaft rotated by the windmill, of a vibratory arm, an adjustably movable support therefor, a hollow block slidably mounted upon said arm, a connecting rod operatively connecting the crank pin of said shaft with said arm for swinging the latter to effect reciprocatory motion to said piston, fluid actuated means for controlling the position of said support with respect to its connection with the piston rod for regulating the stroke of said piston, a valve for controlling the action of the fluid within said means, and a governor driven by the windmill for regulating said valve.

3. In combination, a windmill, a pump, a piston therein having a piston rod, a vibratory arm, a hollow block slidable upon said arm and operatively connected to the piston rod, means for guiding said block in the plane of travel of the piston rod, a crank shaft, operative connection between the windmill and the shaft for rotating the latter at a definite ratio to the speed of the windmill, a connecting rod operatively connecting the crank pin of the shaft with said arm for vibrating the arm to reciprocate the piston, and means to regulate the relative position of said block upon said arm with respect to the connection of the latter with said connecting rod, the last named means comprising fluid operated apparatus, and a speed governor operated by the windmill for regulating the action of the fluid agent in said apparatus whereby the performance of the pump is regulated in a manner to cause the windmill to operate at a substantially uniform speed under varying velocities of the wind.

4. The combination with a windmill and work mechanism therefor, of fluid operated means for varying the amount of performance of said mechanism for controlling the speed of the windmill, said means having a piston operatively connected to said mechanism, a cylinder in which the piston operates, a power actuated fluid pump, communicative connections between said pump and the cylinder at opposite sides of the piston, a control valve included in said connections, said valve being adapted to regulate the supply of fluid under pressure from the pump to either side of the piston and the withdrawal of the fluid from the opposite side of the piston for influencing said piston to regulate said mechanism, and means controlled by the speed of the windmill for regulating the action of said valve.

5. In apparatus as defined in claim 4, wherein the valve is provided with a casing having ports for said connections between the pump and the cylinder, said ports being arranged to be controlled by the valve so as to close the communication between the pump and the cylinder and to confine the piston between two static bodies of fluid when the windmill is operating at an approximately predetermined speed.

6. In apparatus as defined in claim 4, wherein the valve is provided with a casing having ports for said connections between the pump and the cylinder, said ports being arranged to be controlled by the valve so as to close the communication between the pump and the cylinder and to confine the piston between two static bodies of fluid when the windmill is operating at an approximately predetermined speed, and the suction and delivery connections of the pump are connected by a by-pass including a non-return relief valve, said relief valve permitting the fluid being circulated through the pump and the by-pass when the control valve is operating to close communication between the pump and the cylinder.

Signed at Seattle, Washington, this 20th day of May 1926.

FREDERICK R. BURCH.